Jan. 18, 1966 K. H. MacKAY 3,229,946
SERVICE RECEPTACLE
Filed Feb. 4, 1963 3 Sheets-Sheet 1

INVENTOR
KENNETH H. MacKAY
BY Fred L. Witherspoon, Jr. +
Fred. E. Shoemaker
ATTORNEYS

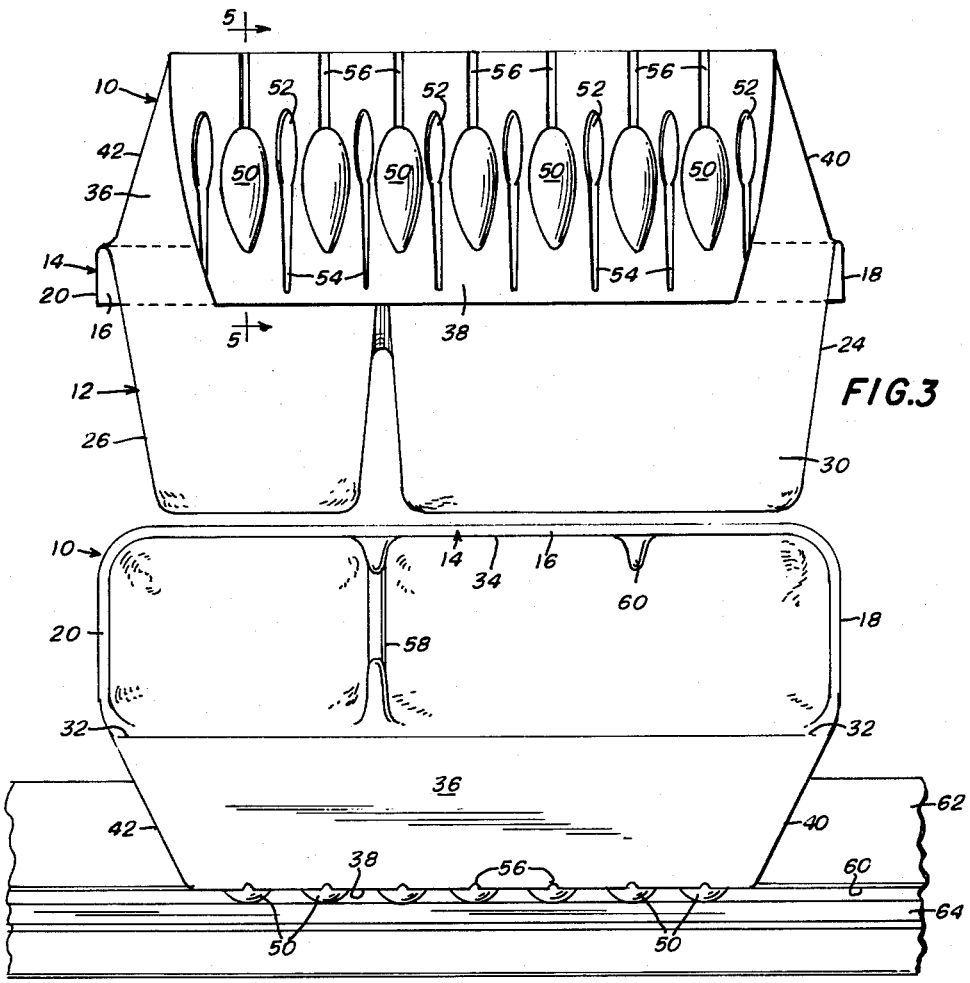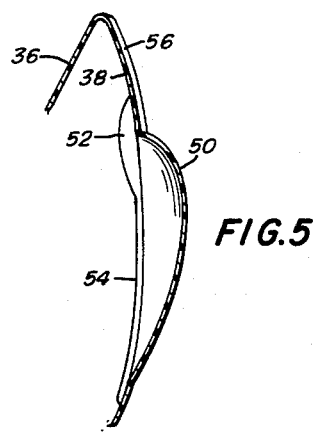

Jan. 18, 1966 K. H. MacKAY 3,229,946
SERVICE RECEPTACLE
Filed Feb. 4, 1963 3 Sheets-Sheet 3

INVENTOR
KENNETH H. MacKAY

BY Fred L. Witherspoon, Jr.
Fred. E. Shoemaker
ATTORNEYS

3,229,946
SERVICE RECEPTACLE
Kenneth H. MacKay, P.O. Box 1149, Ocala, Fla.; George L. MacKay, Kenneth H. MacKay, Jr., and Julia F. MacKay, coexecutors of said Kenneth H. MacKay, deceased
Filed Feb. 4, 1963, Ser. No. 255,773
7 Claims. (Cl. 248—311)

This invention relates to service receptacles and more particularly to unitary service receptacles adapted for support on a vehicle door panel or the like wherein there is a window opening and a space between the window glass and the window molding.

It is an object of this invention to provide a unitary service receptacle adaptable for use on the window opening portion of the door panels of most vehicles.

It is another object to provide a service receptacle having a locking portion adapted to fit down in the space between the window molding and the window glass to retain the receptacle in service position.

It is a further object to provide a service receptacle having a flexible article receiving and carrying portion adaptable to handle articles of various sizes and configurations.

It is a still further object to provide a service receptacle having a flexible article carrying portion with a flexible panel portion adapted to bear on the window molding and a locking flap portion extending from said panel portion adapted to fit down in the space between the window molding and the window glass to retain the receptacle in service position.

It is still another object to so proportion the flexible panel portion and the locking flap portion that the locking flap portion may be used as a cover for the article carrying portion.

It is yet another object to provide a unitary service receptacle which is so inexpensive that it may be given away at "drive-ins" and the like where food and drink are consumed in a vehicle.

The unitary service receptacle of this invention is designed to greatly facilitate the consuming of food and drink in vehicles by providing light, flexible and inexpensive units readily mountable on the window molding of a vehicle. This receptacle comprises a somewhat flexible article carrying portion having the capability of adapting itself to articles of various sizes and configurations. The article carrying portion is cup-like and of general rectangular shape, being approximately three times as long as it is wide. A flexible panel portion extends from one of the long sides generally referred to as the back side. It is this panel portion which rests on the window molding when the unit is in service position. A locking flap portion extends from the panel portion and is adapted for positioning down in the space between the window molding and the window glass to engage both so as to hold the receptacle firmly in service position. The locking flap portion has alternating raised and recessed portions to provide positive and adequate engagement with the window glass and window molding to insure satisfactory retention of the unit in use position.

The above and other objects will become more apparent when taken in conjunction with the following detailed description and drawings, showing by way of example, a preferred embodiment of this invention and wherein:

FIGURE 3 is a rear elevational view;

FIGURE 4 is a top plan view showing the receptacle as it is mounted on the window molding of a vehicle;

FIGURE 5 is a cross-sectional view taken along line 5—5 of FIGURE 3 showing details of the locking flap portion of the receptacle;

Figure 1:
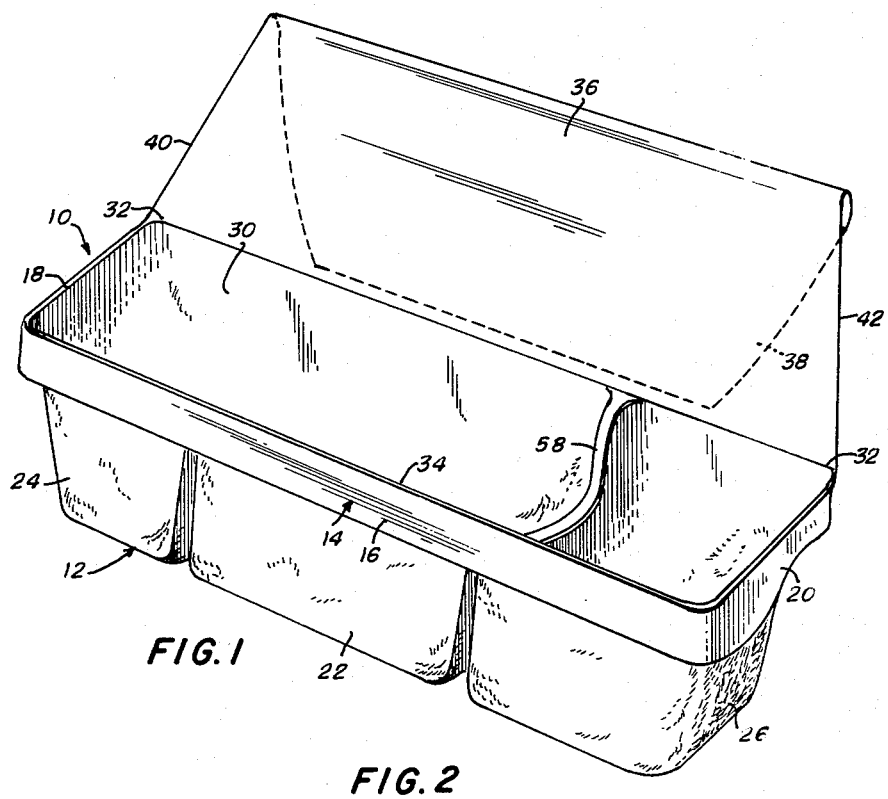
FIGURE 1 is a front perspective view of the service receptacle of this invention.
Figure 2:
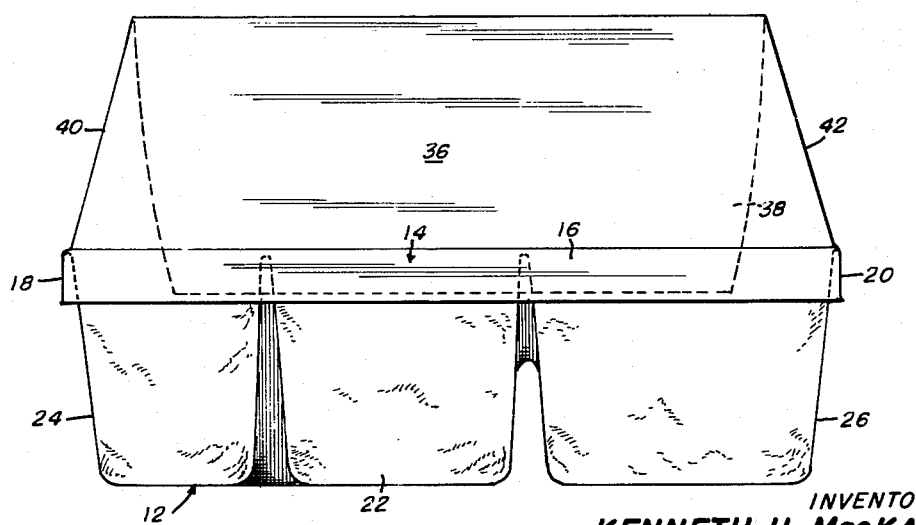
FIGURE 2 is a front elevational view.

Referring to FIGURES 1-4, the service receptable 10 comprises a flexible article receiving and carrying body portion 12 which includes a "U-shaped" frame 14 wherein the bottom of the "U" is the long and front frame member 16 with the legs of the "U" being shorter and forming the sides 18 and 20 of the frame. A front wall portion 22 extends downwardly from the front frame member 16 and end walls 24 and 26 extend downwardly from frame sides 18 and 20, respectively. The front wall portion 22 and end walls 24 and 26 are of approximately the same length and are connected by the bottom portion 28.

Back wall portion 30 extends upwardly from the back edge of bottom 28 and also connects with the back vertical edges of side walls 24 and 26. The back wall portion terminates along a line 32 approximately level with the upper edge 34 of the front frame 16.

As will be apparent from viewing the various figures, the body portion formed by the aforementioned frame, front, side, back and bottom portions produces a cup-like portion in which the length is approximately three times the width and the depth is slightly greater than the width. Obviously, these relationships are subject to wide variation and are merely set forth herein to aid in presenting an accurate picture of one embodiment of this invention.

A flexible supporting panel 36 having a width generally co-extensive with back wall portion 30 extends from the upper edge of said back wall portion. A locking flap 38 extends from the outer edges of this supporting panel 36. This locking flap is somewhat more rigid than that supporting panel 36 for reasons which will be brought out fully later. As shown the side edges 40 and 42 of supporting panel 36 slope inwardly from the upper edge of the back wall portion 30 to produce a slight taper in the planar configuration of said panel. The locking flap 38 which extends from panel 36 is generally co-extensive with same at the line of connection. Here again the side edges 44 and 46 of the flap 38 slope inwardly so as to produce a taper in the flap. Obviously, this taper of the locking flap is of some advantage in use, but, of course, is not essential.

The length of the supporting panel 36, that is the distance from the upper edge of the back wall portion 30 to the point where the locking flap connects to the panel, is approximately equal to the length of side frame member 20, while the length of the locking flap 38, that is the distance from the point where it connects to the supporting panel 36 to its extremity is slightly greater than the length of side frame member 20.

As best illustrated in FIGURES 3-6, the locking flap 38 has a plurality of alternate concave and convex portions extending across the flap. Looking at the flap from the back side as in FIGURE 3 oval locking members 50 are convex and oval locking members 52 with longitudinal portions 54 are concave. As indicated the major axes of the ovals extend lengthwise of the flap. The locking members 50 are larger than locking members 52 and have convex longitudinal strengthening and stabilizing portions 56 extending from their end portions nearest the line of connection between the flap and supporting panel to this line of connection. This arrangement is effectively shown in cross-sectional view, FIGURE 5.

As might be expected in order to meet economic requirements and to provide the desired degree of flexibility, the body portion 12 is made of very thin material, generally a type of plastic. This makes it desirable to provide some reinforcement for the body portion. One means of accomplishing this is by way of rib portion 58 which extends from the front wall 20 rearward to the back wall 30. Actually the rib portion 58 is somewhat U-shaped with the closed portion of the "U" being generally parallel to the bottom 28 and raised therefrom approximately one-half the height of the front wall 22. As indicated the rib extends inwardly from the front and back walls and thereby serves to provide a strengthening element to the body portion 12. This rib portion also in effect provides a means of separating the body into two compartments.

In order to provide additional stiffness to the body portion a vertical rib 60 is formed in the front wall 22 with the rib extending inwardly from said wall. Obviously, a number of such ribs could be used in both the front and back walls if requirements so dictate.

Figure 6:
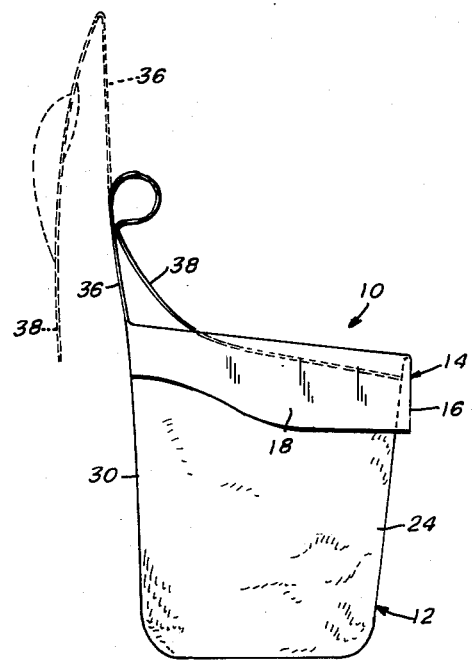
FIGURE 6 is an end elevational view showing the locking flap portion when it is used as a cover for the article carrying portion of the receptacle.

Referring to FIGURE 6, it should be noted that the locking flap 38 and the supporting panel 36 may be used in an alternative manner. For example, from the position shown in dotted lines the flap 38 may be folded over and down into the open tab of the body portion 12 to form a cvover for the opening. This could be particularly useful in a situation where the food served in the receptacle is not completely consumed and it is desired to store same in a covered container.

Figures 7, 8:
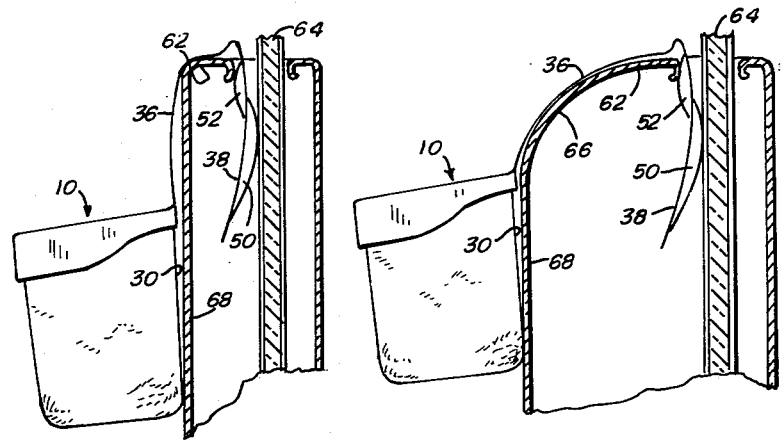
FIGURE 7 is an end elevational view showing the receptacle mounted on a vehicle door panel wherein the window molding is narrow.
FIGURE 8 is an end elevational view showing the receptacle mounted on a vehicle door panel wherein the window molding is quite wide.

In order to observe the manner in which the service receptacle of this invention is used reference is made to FIGURES 4, 7 and 8. In use, the locking flap 38 is passed down into the space 60 between the edge of the window molding 62 and the window glass 64 so that the supporting panel 36 may rest on the upper exposed face 66 of the window molding 62, thereby causing the back wall portion 28 of the body to rest against the door panel 68 or similar panel where such structural combination might be found. At this point, it should be noted that FIGURE 7 shows an arrangement wherein the window molding 62 is quite narrow and FIGURE 8 shows an arrangement wherein the window molding is wide. Even so, this service receptacle works equally well due to the cooperating elements of the supporting panel 36 and the locking flap 38. The high flexibility and length of the panel 36 make it possible for the body portion to be properly positioned on the panel 68 regardless of the width of the window molding 62. This is necessary if the receptacle is to be adaptable for use on most vehicles. In addition, it should be observed that locking members 50 and 52 together with strengthening portions 56 cooperate to provide a firm and positive holding means regardless of the width of the molding 62. This cooperation also means that good holding characteristics are achieved even where the width of space 60 varies to a considerable extent. It must be remembered that locking flap 38 is fairly rigid therefore when downward pull is exerted on panel 36 there is a tendency of the locking flap to pivot about some point on the window molding where the locking member 52 contacts same. Obviously this tendency to pivot is resisted by the lower portion of the flap and thus a tight engagement is effected. In addition, the heights of the raised locking members 50 and 52 are such that this locking action will take place even when the space 60 varies in width.

In addition, the fact that the locking flap is rigid is quite important in that it assures that it will be possible to easily and quickly insert this flap down in the space 60 between the window glass 64 and the window molding 62. If the flap was not rigid enough it might buckle and thus provide no locking or holding action for the receptacle.

As was previously discussed, the body portion is quite thin and flexible which is quite advantageous in that the body will give to a considerable extent to accommodate items of various sizes and configurations.

In view of the foregoing detailed description of this invention it is apparent that this service receptacle responds to a long felt need which has never before been satisfied. The desirability and advantages of such a receptacle will be apparent to anyone but in particular to those who have had occasion to partake of food and beverage at the well known "drive-in." This device will provide the individual service that is so desirable when eating in close quarters in a vehicle. The desirability and ability of this item coupled with its low cost provides a combination not heretofore developed in this field.

I claim:

1. A unitary service receptacle adapted to be supported on a panel such as a vehicle door panel or the like wherein there is a window opening and a space between the window glass and the window molding, said receptacle comprising a flexible article receiving body portion, said body portion having generally vertical front, back and end walls with a bottom connecting same to form an open top flexible cavity, a flexible supporting panel extending from the upper edge portion of the back wall, and a rigid locking flap portion extending from the edge portion of the supporting panel spaced from the upper edge of the back wall, said locking flap portion having locking portions on opposite sides thereof adapted to provide locking friction between the locking flap and the window glass and window molding between which it is passed when in service position.

2. The invention as described in claim 1 and wherein the locking flap and supporting panel are of such size that the supporting panel may be folded down adjacent the upper edge of the back wall whereby the locking flap may be swung down over the open top of the cavity so that the free edge of the locking flap may engage the inner portion of the front frame member to close the open top of the cavity.

3. A unitary service receptacle adapted to be supported on a panel such as a vehicle door panel or the like wherein there is a window opening and a space between the window glass and the window molding, said receptacle comprising a flexible article receiving body portion, said body having a U-shaped frame wherein the closed portion of the "U" is the long and front frame member with the legs of the "U" being shorter and forming the frame sides, a front wall extending downwardly from the front frame member, end walls extending downwardly from the frame sides, said front and end walls being of substantially the same length, a bottom portion connecting the aforesaid walls, a back wall extending upwardly from the rear edge of the bottom and connecting with the rear vertical edges of the end walls, the back wall terminating along a line generally parallel and in alignment with the front frame member, said front, back and end walls together with the bottom forming an open top flexible cavity, a flexible supporting panel portion extending from the upper edge of the back wall, and a locking flap extending outwardly from the edge of the panel spaced from the upper edge of the back wall, said locking flap portion having locking portions on opposite sides thereof adapted to provide locking friction between the locking flap and the window glass and window molding between which it is passed when in service position.

4. The invention as described in claim 3 wherein the locking flap is made relatively rigid.

5. The invention as described in claim 4 and wherein the locking flap has alternate concave and convex locking portions on opposite faces thereof.

6. The invention as described in claim 3 and wherein the front wall has at least one vertically extending reinforcing rib formed therein.

7. The invention as described in claim 3 and wherein the upper edge of the back wall is more flexible than the body frame so that the cavity configuration will easily change to accommodate articles of various sizes and shapes.

References Cited by the Examiner

UNITED STATES PATENTS

| | | | |
|---|---|---|---|
| 1,746,634 | 2/1930 | Breneman | 206—19.5 |
| 1,848,005 | 3/1932 | Endreson | 206—19.5 |
| 2,673,056 | 3/1954 | Manetti | 206—19.5 |
| 2,770,411 | 11/1956 | MacKay | 206—19.5 |
| 2,830,748 | 4/1958 | Faltin | 224—42.46 |
| 2,858,178 | 10/1958 | Marshall | 220—23.83 |
| 2,880,046 | 3/1959 | Black | 211—71 |
| 3,039,616 | 6/1962 | Proffit | 211—71 |

THEREON E. CONDON, *Primary Examiner.*

EARLE J. DRUMMOND, *Examiner.*

W. T. DIXSON, *Assistant Examiner.*